United States Patent [19]
Yoshio

[11] Patent Number: 4,707,817
[45] Date of Patent: Nov. 17, 1987

[54] METHOD OF GENERATING TRACKING SERVO SIGNAL FOR OPTICAL DISC PLAYBACK APPARATUS

[75] Inventor: Junichi Yoshio, Tokorozawa, Japan
[73] Assignee: Pioneer Electronic Corporation, Tokyo, Japan
[21] Appl. No.: 712,179
[22] Filed: Mar. 15, 1985
[30] Foreign Application Priority Data
　Mar. 16, 1984 [JP] Japan .................................. 5951649
[51] Int. Cl.[4] .............................................. G11B 7/00
[52] U.S. Cl. ................................................... 369/46
[58] Field of Search .................... 358/342; 369/44–46; 250/201–204

[56] References Cited
U.S. PATENT DOCUMENTS

| | | | |
|---|---|---|---|
| 4,502,134 | 2/1985 | Kondo et al. | 369/46 |
| 4,589,103 | 5/1986 | Tajima | 369/46 |
| 4,608,680 | 8/1986 | Yano | 369/46 X |

Primary Examiner—Robert L. Richardson
Attorney, Agent, or Firm—Fleit, Jacobson, Cohn & Price

[57] ABSTRACT

A method of generating a servo signal for a servo system of a disc player employing an optical method of data read-out, whereby a pair of sensing signals derived from reflection of a single light beam from the disc, which differ in phase by an amount corresponding to a tracking error, are processed to derive a first difference signal representing the difference between the respective LF components of the sensing signals and a second difference signal representing the difference between the respective HF envelope components of the sensing signals, with the first and second difference signals being mixed in a differential amplifier in a specific ratio to thereby derive servo signal having no DC offset component, and with the relative proportions of these difference signals prior to this mixing being adjusted by amplifying or attenuating one of the signals such as to established a value for the mixing ratio which is optimized with respect to an amount of tilt of the recording disc or an amount of inclination of an object lens in the optical system, or is set to a value which is a compromise between these optimum values.

3 Claims, 14 Drawing Figures

METHOD OF GENERATING TRACKING SERVO SIGNAL FOR OPTICAL DISC PLAYBACK APPARATUS

BACKGROUND OF THE INVENTION

The present invention relates to a method of generating a servo signal for a servo system used to control the position of a data sensing light spot with respect to recording tracks on a recording disc, in a recorded data playback apparatus of the type which employs an optical system (e.g. based on a laser beam) for data read-out from a recording disc, generally referred to as an optical disc player or laser disc player.

In particular, the present invention is related to a method of generating a tracking servo signal for a servo system of the type in which sensing is performed using a single light beam, which is reflected from the disc surface onto a pair of closely mutually adjacent photo-electric elements, to thereby derive a pair of sensing signals having respective low frequency components therein (assuming that the light beam is moved radially across the recording disc at constant velocity with the tracking servo loop opened) which vary in phase in accordance with the deviation of the light spot formed on the recording disc by the light beam from a position at the center of a recording track. Each recording track consists of a series of pits, each being a minute elongated depression in the recording disc surface, of a contour approximating to an arc of a circle, as viewed in cross-section along the track direction. The diameter of the light spot is less than that of the spacing between the centers of a pair of mutually adjacent recording tracks. The level of light reflected from such a disc is a maximum when reflection occurs from the center of a recording track. Thus, if the light spot is moved across the rotating disc surface, along the direction of a radius of the disc, the portion of reflected light falling upon one photo-electric element will reach a maximum level when that portion is located at the center of a recording track. As the light spot is moved further, the portion of reflected light falling upon the other photo-electric element will then reach a maximum, and so on. Thus, if the optical system is perfectly aligned with respect to the disc surface and the photo-electric elements, the output signals from the photo-electric elements (to be precise, the low-frequency components of these output signals, with the RF component due to the modulation of the reflected light by the data recorded on the recording tracks having been removed) will become equal in level when center of the light spot is located at the center of a recording track. This is the basis of the "single beam" type of tracking servo system, since in principle it is only necessary to continuously control the optical system such that the output signals from the two photo-electric elements are identical in level.

It is a feature of such a recorded data playback apparatus that the spacing between adjacent recording tracks is extremely minute, so that the light spot, i.e. the light spot which is focussed onto the recording disc surface, must also be of very small diameter. It is therefore necessary that any tracking deviation, i.e. deviation of the light spot from a position centrally disposed on a recording track as the recording disc rotates, must be held to a very low level. Thus the tracking servo system which controls the optical system, e.g. by displacing the object lens of the optical system in a direction along the disc surface at right angles to the track direction, such as to compensate for any such tracking deviation, must provide an extremely high degree of control accuracy. In prior art methods of deriving and applying a servo signal for such a servo system, the system is adjusted, prior to use, only such that the tracking error signal, i.e. the servo signal contains no DC component, i.e. no DC offset. However the applicant has found that such a method is not completely satisfactory, since optimum elimination of this DC offset is not attained for various different positional relationships between the optical system used for data sensing and the recording disc. That is to say, if, due to manufacturing deviations the recording disc should be slightly tilted with respect to the direction of the light beam which produces the light spot, i.e. with respect to the optical axis of the optical system, or if the object lens (which focusses the light beam onto the recording disc to form the light spot referred to above ) in that optical system should be shifted from a correctly aligned position with respect to the main optical axis of that system, then optimum compensation for tracking deviation cannot be attained by simply adjusting the value of offset voltage of the servo signal to zero when the light spot is centrally positioned on a recording track.

The present invention therefore describes a method of generating such a servo signal whereby optimum compensation for DC offset in the tracking error signal can be obtained, for a recorded data playback apparatus in which a certain amount of inclination of the recording disc or positional deviation of the object lens can be anticipated.

SUMMARY OF THE INVENTION

The method of generating a servo signal for a servo-system in a recorded data playback apparatus according to the present invention is basically as follows. First and second sensing signals are derived, i.e. from a pair of suitably positioned photo-electric elements, which mutually differ in phase in accordance with the magnitude of the tracking deviation of the light spot. A first difference signal is then produced, which varies in accordance with the difference in level between the respective low-frequency components of the first and second sensing signals and a second difference signal of amplitude proportional to a difference between the respective high-frequency envelope components of the first and second sensing signals (i.e. resulting from modulation by the data recorded on the recording track). The first and second difference signals are then mixed, i.e. in a differential amplifier, with a specific ratio of the relative proportions of the first and second difference signals being utilized in the mixing. This is achieved by modifying the amplitude of the first or the second difference signal prior to the mixing, by applying a fixed amount of amplification or attenuation to that signal, such as to set the mixing ratio of the first and second difference signals to an optimum value. This optimum value is determined by the amount of inclination of the recording disc relative to a perpendicular condition with respect to the optical axis of the optical system, or by the amount of positional deviation of the object lens in that system relative to the optical axis of the system, or is determined in accordance with both of these amounts of inclination (i.e. as a compromise between the optimum value of the ratio if the positional deviation of the object lens alone were to be considered and the optimum value of the ratio if the inclination of the recording disc alone were to be considered).

DESCRIPTION OF THE PREFERRED EMBODIMENTS

Figure 1:
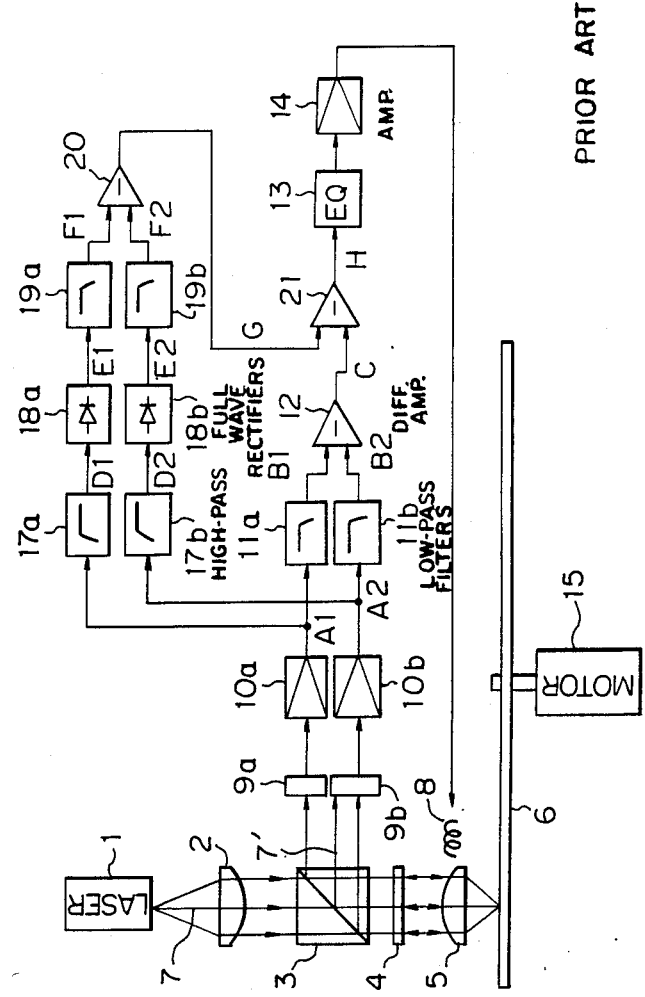
FIG. 1 is a block circuit diagram of a tracking servo system for a recorded data playback apparatus according to the prior art.

FIG. 1 is a block circuit diagram of an embodiment of a tracking servo system which has been disclosed in a prior art patent, i.e. Japanese patent No. 58-73023, having similar objectives to the present invention. The apparatus comprises an optical system, comprising a laser light source 1, which emits a light beam 7 that is directed by a lens 2 through a beam splitter 3 and a ¼-wavelength plate 4, and is focussed by an object lens 5 to be incident as a light spot upon the surface of a recording disc 6. This recording disc 6 is rotated by a motor 15. The resultant light reflected from recording disc 6 is passed again through object lens 5, through the ¼-wavelength plate 4, and is thereby deflected by beam splitter 3, as indicated by 7', to be incident upon photo-electric elements 9a and 9b. At this stage, the light beam is of appreciable diameter. If the components of the optical system are perfectly aligned, and the recording disc is oriented perfectly perpendicular to the direction of the incident light beam, then ½ of the beam is incident on photo-electric element 9a and ½ upon photo-electric element 9b. Output signals, referred to in the following as first and second sensing signals, are thereby output by photo-electric elements 9a and 9b respectively, and these are amplified by amplifiers 10a and 10b respectively. The resultant output signals from amplifier 10a, 10b are input to low-pass filters 11a and 11b respectively, and the output signals thereby produced from low-pass filters 11a and 11b are applied as input signals B1 and B2 respectively to inputs of a differential amplifier 12. An output signal C is thereby produced by differential amplifier 12, whose value represents the difference between the levels of signals B1 and B2.

In addition, output signals A1 and A2 from the outputs of amplifier 10a and 10b respectively are also input to high-pass filters 17a and 17b respectively, to thereby produce output signals D1 and D2 respectively. These output signals D1 and D2 represent the respective high-frequency components in signals A1 and A2. Signals D1 and D2 are then passed through full-wave rectifiers 19a and 18b respectively, to produce rectified signals E1 and E2 respectively. Signals E1 and E2 are then passed through low-pass filters 19a and 19b respectively, to produce output signals F1 and F2. The levels of signals F1 and F2 represent the high-frequency envelope components of signals A1 and A2 respectively. Signals F1 and F2 are then applied to inputs of a differential amplifier 20, which produces an output signal G whose level represents the difference between the levels of signals F1 and F2.

Signal C, representing the difference between the low-frequency components of the first and second sensing signals output from photo-electric elements 9a and 9b and signal G, representing the difference between the high-frequency envelope components of the first and second sensing signals output from photoelectric elements 9a and 9b, are then respectively input to a differential amplifier 21. A difference signal H is thereby derived, representing the difference between the levels of signals G and C. Signal H is then passed through an equalizer circuit 13 and an amplifier 14, to be output as a servo control signal which is applied to a coil 8 of an actuator apparatus for driving the optical system described above, such as to displace the light spot focussed on recording disc 6 by object lens 5, along a direction of a radius of recording disc 6, with the amount of displacement thus produced being determined by the level of signal H. In this way, tracking servo operation is achieved, i.e. the light spot is maintained substantially centrally located on a recording track of recording disc 6 as recording disc 6 rotates.

As described in the patent referred to above, the DC component of output signal H, i.e. the DC offset of that signal, can be cancelled to zero by suitably adjusting the gain of amplifier 12. In this way, compensation can be applied for certain inaccuracies in the servo system, e.g. for a misalignment of photo-electric elements 9a and 9b with respect to the incident light beam thereon, such that substantially more light falls upon one photoelectric element than upon the other.

However the present applicant has found that for any specific tracking servo system of this type, i.e. in which a single light beam is utilized to generate a tracking servo signal, there is an optimum value for the above ratio whereby signals G and C are mixed, i.e. combined in differential amplifier 21, with respect to variations in the inclination of recording disc 6 with respect to the incident light beam produced by the optical system, i.e. an optimum value for this ratio whereby a minimum amount of variation in the offset component of the tracking servo signal for a range of different values of inclination of recording disc 6. Ideally, recording disc 6 should be aligned perfectly perpendicular to the light beam which is produced by the optical system and focussed thereon by object lens 5. However in a practical manufacturing process, a certain amount of deviation from this mutually perpendicular relationship will arise, i.e. with a recorded data playback apparatus produced by a practical manufacturing process there will be a certain amount of inclination of the recording disc. It would not be practical to measure the value of inclination for every apparatus produced, however it is possible to determine the range of inclination which can be anticipated. It is therefore desirable to set the signal mixing ratio described above to a value which is optimized with respect to changes in recording disc inclination.

In addition, the present applicant has found that there is an optimum value for the above signal mixing ratio with respect to an amount of positional deviation of object lens 5 (i.e. with respect to the optical axis of the optical system). It is therefore desirable to set the signal mixing ratio to such an optimum value, since in a practical manufacturing process there will be a certain amount of positional tolerance relating to object lens 5. In addition, the position of object lens 5 may be altered slightly, subsequent to manufacture, due to such reasons as externally applied mechanical shock, etc.

The applicant has found that it is possible to establish a value of the above signal mixing ratio which is intermediate between the optimum value with respect to recording disc inclination and the optimum value with respect to object lens positional deviation, which is satisfactory with regard to both of these variables.

Figure 2:
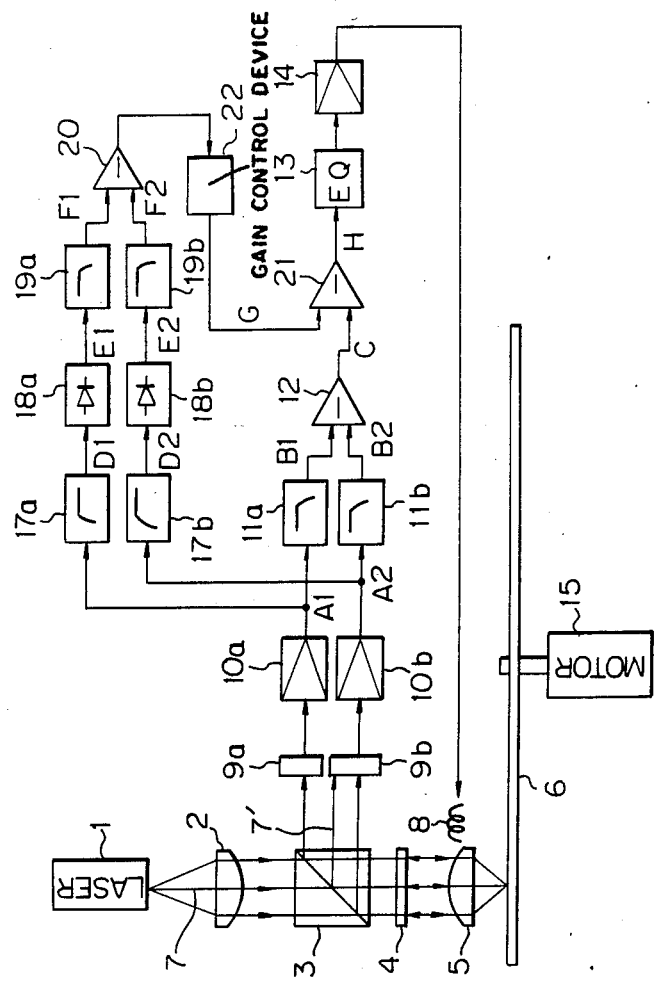
FIG. 2 is a block circuit diagram of a tracking servo system for assistance in describing the method of the present invention.

The method of the present invention will now be described with respect to the tracking servo system shown in the block circuit diagram of FIG. 2. In FIG. 2, components corresponding to those in the system of FIG. 1 are indicated by corresponding reference numerals. The only difference between this system and that illustrated in FIG. 1 lies in the addition of a gain control device 22, which may be a variable gain amplifier or an attenuator and is connected between the output of differential amplifier 20 and the corresponding input of differential amplifier 21.

Figure 3A:
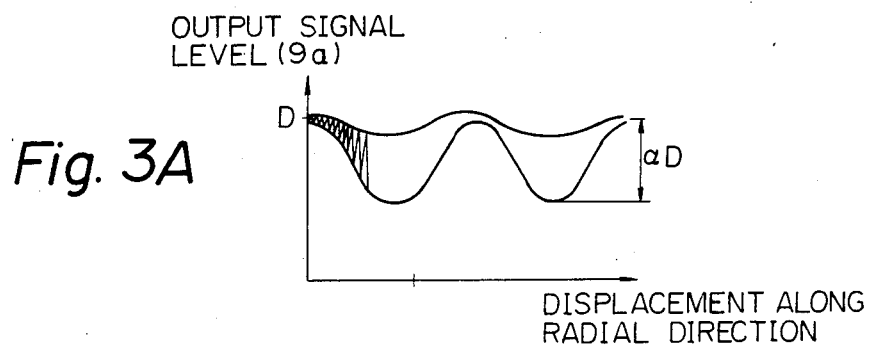
FIGS. 3A through 3F are diagrams showing the relationship between radial movement of a light spot and low-frequency components and the envelope components of high-frequency components of first and second sensing signals produced by photo-electric elements in the system of FIG. 2.
Figure 3B:
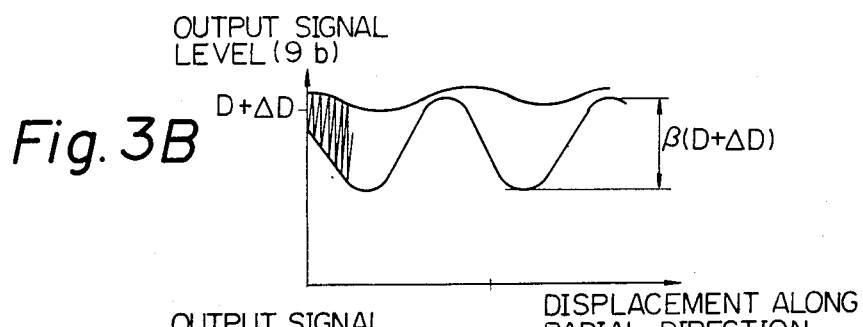
Figure 3C:
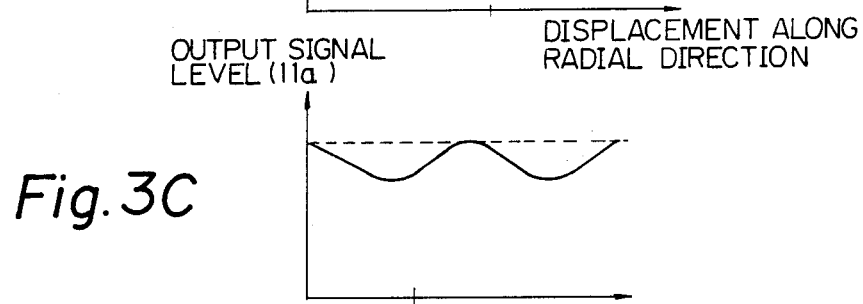
Figure 3D:
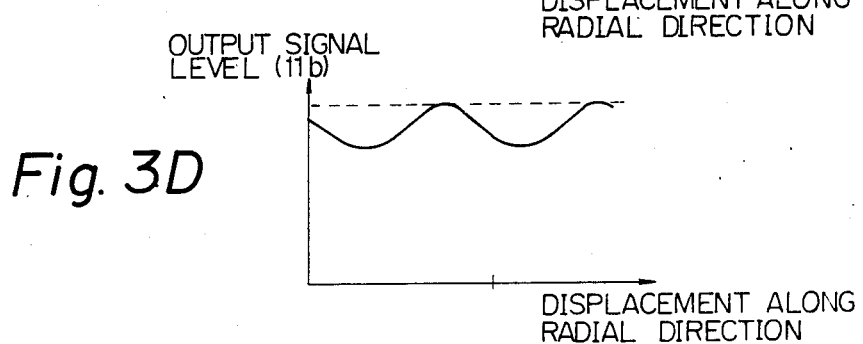
Figure 3E:
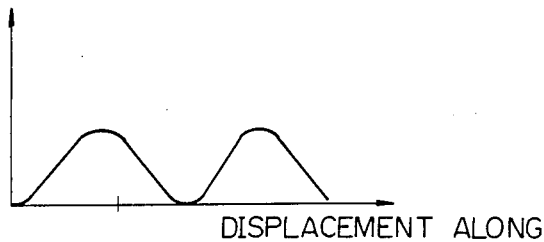
Figure 3F:
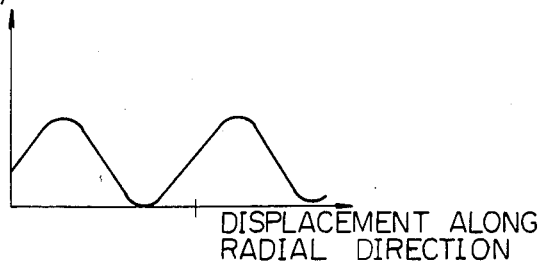

The first and second sensing signals output by photo-electric elements 9a and 9b, are modulated in accordance with the data recorded on a recording track of recording disc 6. Examples of these first and second sensing signals are shown in FIGS. 3A and 3B. The corresponding output signals which are produced by amplifying these first and second sensing signals in amplifier 10A and 10B and passing the amplified signals through low-pass filters 11A and 11B, i.e. output signals B1 and B2, are shown in FIGS. 3C and 3D respectively. Signals F1 and F2, which correspond to the high-frequency envelope components of the first and second sensing signals, are shown in FIGS. 3E and 3F respectively. As stated hereinabove, the levels of output signals from photoelectric elements 9a and 9b will in general be different, due to component inaccuracies with respect to positioning etc, even when the light spot is positioned optimally with respect to a recording track (i.e. at the position whereby a maximum level of output RF signal is produced by the pick-up of the recorded data playback apparatus). For such reasons, the latter optimum position of the light spot may not correspond to the condition in which the levels of output signal from photo-electric elements 9a and 9b are identical.

The ratio of DC level to AC level for the output signals from photo-electric elements 9a and 9b, i.e. the first and second sensing signals, will be designated in the following as $\alpha$ and $\beta$ respectively, as illustrated in FIGS. 3A and 3B, and the DC levels of these signals will be designated as D and (D+$\Delta$D) respectively. Thus, the AC levels of the first and second sensing signals will be D and (D+$\Delta$D) respectively. The levels of low-frequency output signals B1 and B2 from low-pass filters 11a and 11b will be designated in the following as 9a(LF) and 9b(LF) respectively. The levels of RF output signals from high-pass filter 19a and high-pass filter 19b will be designated as 9a(RF) and 9b(RF) respectively. In this case, the following equations will be true:

$$9a(LF) = (D - \tfrac{1}{2}\alpha D)) + \tfrac{1}{2}\alpha D e^{j(\omega t + \delta)} \quad (1)$$

$$9b(LF) = \{D + \Delta D - \tfrac{1}{2}\beta(D + \Delta D)\} + \tfrac{1}{2}\beta(D + \Delta D)e^{j(\omega t - \delta)} \quad (b\,2)$$

$$9a(RF) = \tfrac{1}{2}\alpha D(-e^{j(\omega t + \delta)} + 1) \quad (3)$$

$$9b(RF) = \tfrac{1}{2}\beta(D + \Delta D)(-e^{j(\omega t - \delta)} + 1) \quad (4)$$

In the above, is the displacement of the light spot focussed on recording disc 6 by object lens 5, with respect to movement along the radial direction of recording disc 6, expressed as an angular quantity (i.e. assuming that the light spot is moved radially across the recording disc at constant velocity, and with the distance between the centers of two mutually adjacent recording tracks corresponding to 360°) is a phase difference corresponding to the distance (upon the recording disc) of the centers of the respective portions of the incident light spot which are reflected therefrom and refracted to be respectively incident on photo-electric element 9a and photo-electric element 9b.

By combining equations (1) to (4) above, the tracking servo signal H which is thereby output from differential amplifier 21 can be expressed as follows, with the gain coefficient of variable-gain amplifier (or attenuator) 22 being designated as $\gamma$:

$$H = -\Delta D - \{\alpha D - \beta(B + D)(\tfrac{1}{2} + \tfrac{1}{2}\gamma) + \quad (5)$$
$$\alpha D(\tfrac{1}{2} + \tfrac{1}{2}\gamma)e^{j(wt+\delta)} -$$
$$\beta(D + \Delta D)(\tfrac{1}{2} + \tfrac{1}{2}\gamma)e^{j(wt-\delta)}$$

The first and second items in the above equation represent the DC component of signal H, while the third and fourth items represent the AC component of that signal. It will be apparent that the two items representing the DC component can be made of identical value and opposite sign, by suitably selecting the value of gain coefficient $\gamma$, so that they mutually cancel. In this way, the DC component, i.e. the DC offset of output signal H, can be reduced to zero.

It should be noted that the level of the AC component of signal H at any particular radial position of the light spot is the sum of the amplitudes of the low-frequency component and the RF component at that position.

Figure 4:
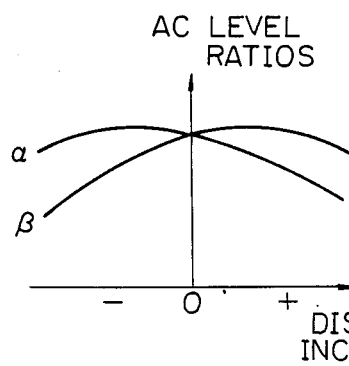
FIG. 4 is a graph showing the relationship between recording disc inclination and the ratios of AC to DC components in each of the first and second sensing signals produced by photo-electric elements in the system of FIG. 2.
Figure 5:
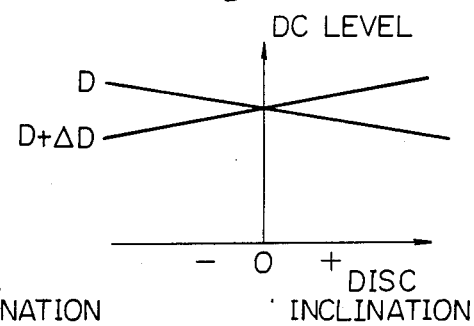
FIG. 5 is a graph showing the relationship between recording disc inclination and the relative DC components in each of the first and second sensing signals produced by photo-electric elements in the system of FIG. 2.

FIG. 4 is a graph which shows a typical relationship between the angle of inclination of a recording disc and the corresponding variations in the values of $\alpha$ and $\beta$. FIG. 5 is a graph which shows the relationship between the values D and (D+$\Delta$D) with respect to changes in the amount of inclination of the recording disc. These changes with variation of the angle of inclination of the recording disc are the result of shifts of the positions at which the reflected light beam is incident upon photoelectric elements 9a and 9b. As shown in FIG. 5, there is a substantially first-order, i.e. linear relationship between the changes in the value of D and (D+ΔD) and the amount of inclination of the recording disc. In the case of $\alpha$ and $\beta$ however, a second-order type of relationship between these quantities and the amount of disc inclination. This is due to the fact that as the recording disc is tilted, the effective degree of modulation of the reflected light, due to the pits formed in the recording tracks (constituting the recorded data) will decrease.

Figure 6:
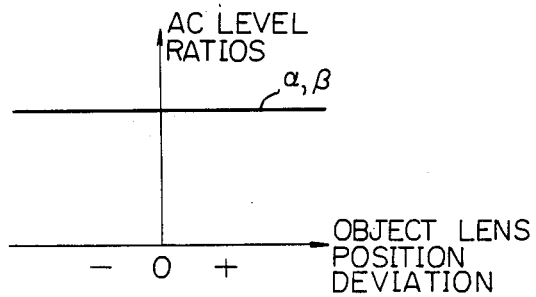
FIG. 6 is a graph showing the relationship between object lens positional deviation and the ratios of AC to DC components in each of the first and second sensing signals produced by photo-electric elements in the system of FIG. 2.

FIG. 6 shows the relationship between the AC level ratios $\alpha$ and $\beta$, and the amount of positional deviation of the object lens. The relationship between DC levels D and (D+ΔD) and the amount of positional deviation of the object lens is similar to that shown in FIG. 5, i.e. is a first-order function, but has a slope which is substantially zero, i.e. $\alpha$ and $\beta$ are substantially constant with respect to changes in the positional deviation of the object lens.

The above relationships will now be expressed in the form of equations. The case of inclination of the recording disc will first be examined. The amount of inclination of the recording disc will be designated as X, while the DC levels of the first and second sensing signals from photo-electric elements 9a and 9b will be designated as $D_0$ (i.e. assuming that both of these DC levels are identical when the inclination of the recording disc is zero). The rate of variation of D will be designated as $-M$, and the rate of variation of D+ΔD will be designated as M. The AC level ratios at a disc inclination of zero will be designated as $\alpha_0$ and $\beta_0$, while the value of inclination of the recording disc for which $\alpha$ and $\beta$ respectively attain peak values thereof will be designated as $X\alpha$ and $-X\beta$. The relationships described graphically above can then be expressed in the form of equations as follows, utilizing a coefficient R for the second-order function illustrated in FIG. 4.

$$D = -MX + D_0 \quad (6)$$

$$\alpha = -R(X+X\alpha)^2 + \alpha_0 \quad (8)$$

$$D+\Delta D = MX + D_0 \quad (7)$$
$$\beta = -R(X+X\beta)^2 + \beta_o \quad (9)$$

Figure 7:
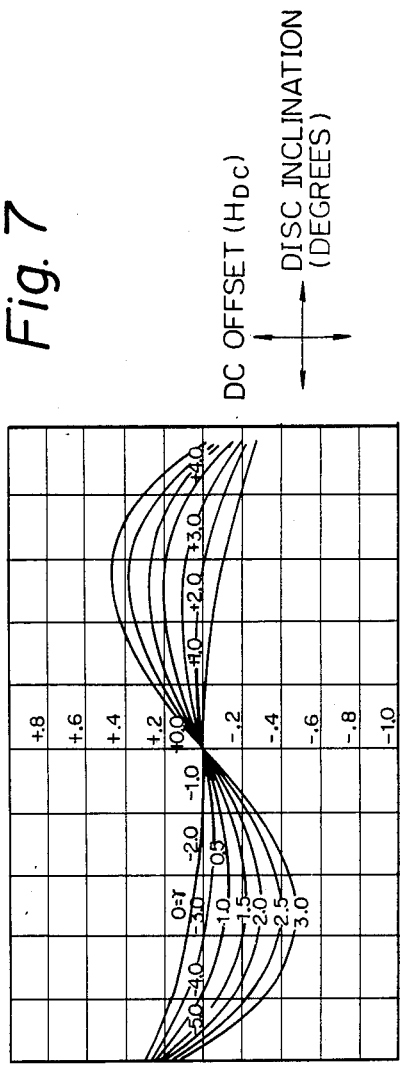
FIG. 7 is a set of graphs showing the relationship between the DC component of the output servo signal and recording disc inclination, for different values of an amplification factor $\gamma$.
Figure 8:
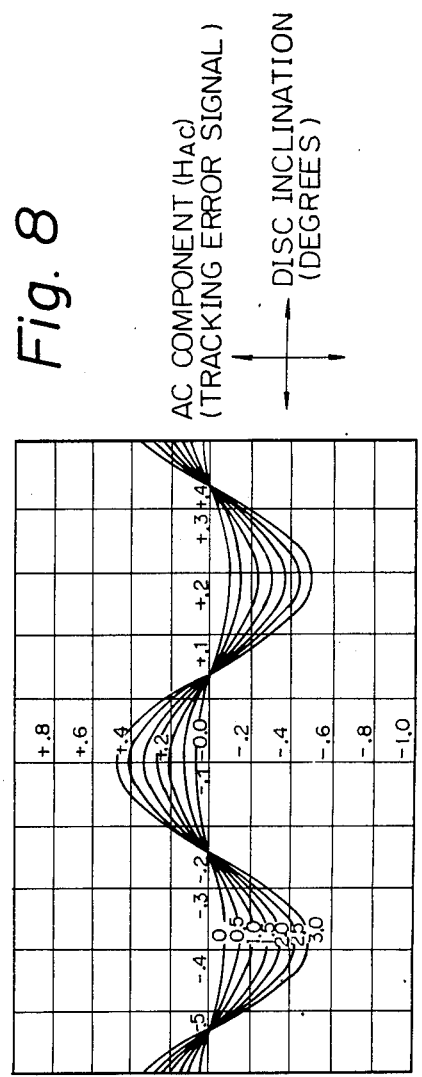
FIG. 8 is a set of graphs showing the relationship between a DC component of the output servo signal and object lens positional deviation, for different values of amplification factor $\gamma$.
Figure 9:
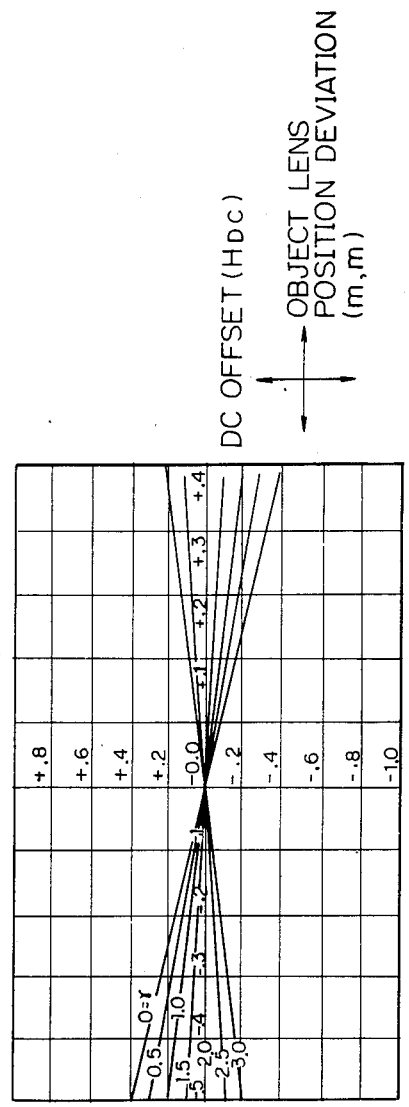
FIG. 9 is a set of graphs showing the relationship between the DC component of the output servo signal and recording disc inclination, for different values of amplification factor $\gamma$.

Constants for insertion in the above equations were measured, using a model system, and the resultant values of D, (D+ΔD), $\alpha$ and $\beta$ were calculated for various values of inclination of the recording disc. These values were inserted into equation (5) above, to determine the manner in which the AC and DC components of tracking servo signal H will vary in accordance with inclination of the recording disc. The results obtained for the DC component $H_{DC}$, i.e. the DC offset of signal H (obtained from the first two items in equation (5)) were plotted, for different values of gain coefficient $\gamma$, as shown in FIG. 7. The corresponding values of variation of AC component $H_{AC}$ of signal H with changes in inclination of the recording disc are plotted in FIG. 8, also for different values of $\gamma$. As stated above, the values of $\alpha$ and $\beta$ remain substantially constant with respect to changes in the positional deviation of the object lens, so that only D and (D+ΔD) will vary in this case. The resultant changes in the DC offset $H_{DC}$ with respect to positional deviation of the object lens are plotted in FIG. 9, for various values of gain coefficient As shown in FIG. 9, the DC offset $H_{DC}$ displays almost no change with respect to changes in the positional deviation of the object lens if a value for $\gamma$ of approximately 2 is selected. Similarly as shown in FIG. 7, the DC offset displays a minimum amount of variation with respect to changes in the inclination of the recording disc if a value of $\gamma$ of approximately 0.5 is selected. It can thus be understood that it is possible to either select a value of $\gamma$ which is optimum with respect to changes in the inclination of the recording disc or, if object lens positional stability must be taken into consideration, a value of $\gamma$ can be selected which is a compromise between the optimum value thereof with respect to changes in the inclination of the recording disc and the optimum value thereof with respect to changes in the positional deviation of the object lens.

It has been found that for the case of a inclination of the recording disc having a maximum value of $\pm 1°$, and an object lens deviation having a maximum value of $\pm 200$ micronmeters, a value of $\gamma$ in the range 1 to 1.5 was satisfactory, enabling a tracking error signal to be obtained for which DC offset was sufficiently compensated over the full range of variation of inclination of the recording disc and positional deviation of the object lens.

In the example described above, the values of D, ΔD, $\alpha$, and $\beta$ were mathematically approximated, and the approximated values were inserted into equation (5). However it is also possible to use measured values directly, to obtain a more accurate degree of compensation of the DC offset.

Also in the above example, variation of $\gamma$ by means of gain control amplifier 22 is described, to control the level of output from amplifier 20. However it is equally possible to make amplifier 20 itself a gain controlled amplifier for this purpose, or to control the level of output signal from amplifier 12, to attain the same objectives.

Although the present invention has been described in the above with reference to specific embodiments, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A method generating a tracking servo signal for a servo system which performs position control of a data read-out optical system in an apparatus for playback of data recorded on a track of a rotating recording disc, the method comprising:
    directing a light beam through said optical system to fall upon said disc;
    receiving upon first and second photo-electric elements light reflected from said disc as a result of said light beam, said first and second photo-electric elements being positioned such that approximately one-half of said reflected light falls upon said first and second photo-electric elements, respectively, with first and second sensing signals being thereby produced by said first and second photo-electric elements including respective high-frequency envelope components resulting from data recorded on said track;

processing said first and second sensing signals to derive respective low frequency components thereof, and subtracting one of said low-frequency components from the other to produce a first difference signal;

processing said first and second sensing signals to derive said respective high-frequency envelope components thereof, and substracting one of said high frequency envelope components from the other to derive a second difference signal;

amplifying or attenuating said second difference signal by a predetermined gain factor, to derive a modified second difference signal;

subtracting one of said first difference signal and said modified second difference signal from the other, to derive said tracking servo signal; and applying said tracking servo signal to said servo system, for controlling said optical system to maintain a position of incidence of said light beam on said disc at a central position of said track;

said predetermined gain factor being selected to have a value providing maximum elimination of a first DC offset component of said tracking servo signal resulting from said disc deviating from a condition of being perpendicular to said light beam.

2. A method of generating a tracking servo signal according to claim 1, in which said optical system includes at least one lens for focussing said light beam, and in which the value of said gain factor is selected as a compromise between a value which optimizes elimination of said first DC offset component and a value which optimizes elimination of a second DC offset component resulting from a positioning error of said lens with respect to said optical system.

3. A method of generating a tracking servo signal according to claim 1, in which said step of processing said first and second sensing signals to derive said high frequency envelope components thereof comprises transferring each of said first and second sensing signals sequentially through a high-pass filter, a full-wave rectifier, and a low-pass filter.

* * * * *